Oct. 21, 1958  S. V. CRAVENS  2,856,668
CONCRETE BLOCK MOLDING MACHINE
Filed April 22, 1952  4 Sheets-Sheet 1

INVENTOR.
SAMUEL V. CRAVENS
BY
Reynolds, Beach & Christensen
ATTORNEYS

INVENTOR.
SAMUEL V. CRAVENS
BY
Reynolds, Beach & Christensen
ATTORNEYS

United States Patent Office 2,856,668
Patented Oct. 21, 1958

2,856,668

CONCRETE BLOCK MOLDING MACHINE

Samuel V. Cravens, Portland, Oreg., assignor to Dominaire Constructions, Inc., Seattle, Wash., a corporation of Washington Application April 22, 1952, Serial No. 283,700

11 Claims. (Cl. 25—41)

Cup-and-button building blocks molded of concrete or the like are known, and in some areas have come into rather general use. An example of such blocks and of wall structures erected therewith is to be found in the reissue patent No. Re. 22,913 to R. D. Wells, dated September 9, 1947.

Such wall structures employing matching and interfitting cups and buttons will inevitably, in the aggregate, require basic blocks of different sizes, styles, and shapes, for instance, different lengths of stretcher blocks, crossbond blocks differing from one another in their length or width, and sometimes double-tiered and single tiered blocks. This does not take into account various inside and outside corner blocks, and others varying less radically than do the different styles of basic blocks. Even with the most carefully systematized series of blocks, in accordance with the principles of the Wells invention, some twelve or more block styles or sizes are required, not counting the minor variations.

Whereas some wall structures will require only a few basic styles or sizes of blocks, other wall structures will require many or all the basic styles or sizes. For example, a simple warehouse wall, of two tiers, continuing for long distances without appreciable breaks, may require only three or four different styles or sizes of blocks, whereas a residence having numerous angles, short runs, and interior partitions may require almost all styles and sizes. In the first instance the wanted blocks would be required in large numbers, and the unused styles or sizes would not be required at all; in the second instance some of nearly all styles and sizes would be wanted, but the proportionate numbers of each would vary widely from the proportions wanted in the first instance. No hard and fast rule can determine these proportions under all or any circumstances; it is necessary to make such numbers of each style, size, and shape of block as experience on a particular job shows will be or is being required. This means, in effect, that the number of any particular style or size, and the ratio of that style or size to all others, must be determined and adjusted from time to time, as work progresses or as conditions change, or otherwise there must be a large inventory of all sizes, shapes and styles on hand at all times, from which to draw those particular ones needed, and in the numbers required, which is hardly economically feasible.

These two factors, even the minimum number of different sizes, styles, and shapes, multiplied by the possible number of blocks of any one or several different sizes or styles that may be required for a given wall structure, makes the storage space required and the investment in inventory of blocks a formidable obstacle to the economical utilization of such blocks, unless some way can be found to lessen the equipment needed to satisfy one or both such factors.

Machines such as are used in the manufacture of standard hollow (or solid) concrete blocks (lacking cups and buttons) are wholly suited to make up such standard blocks in the relatively few sizes and styles needed, and when extreme accuracy in the blocks is of small moment. If after making one style or size of block another is required, the mold set is merely changed, and the desired quantity of the new style or size is run off. The small number of mold sets required makes this economically practicable, and a removable pallet that will support one style or size of standard block will as well support the different style or size, for the pallet has none other than a supporting function.

When it comes to blocks of the cup-and-button type, the problem is vastly increased, particularly in its economic phases. Essentially the practicability of such cup-and-button blocks depends upon the exactitude and economy with which they can be manufactured. Concerning exactness, each cup or button in any given wall course and tier must be accurately formed, and must also be accurately located at a modular distance, or a multiple-modular distance in a straight line, or in lines at right angles to one another, from all adjacent cups and buttons in the same or in adjoining blocks, in the same course and in the courses above and below, and in adjoining tiers. It must be located at a half-modular distance, exactly, from the adjacent vertical block surface. Failure so to locate the cups and buttons makes impossible the fitting of any one block in any of the various relationships on another, or spanning the gap betoween two or more others, for correct intertying or cross-bonding. In consequence such blocks must be machine made, for accuracy, and also for economy of manufacture.

Now while the machines for making standard blocks are known, the blocks they make are not and do not need to be particularly accurate, and whereas these machines can be supplied with a few different mold sets for varying the sizes and styles of standard blocks, it would be a greatly more expensive project to provide the numerous mold sets, for use in the same way to manufacture the various styles and sizes of cup-and-button blocks, and, more particularly, to supply the great variety of combinations of different styles and sizes in a single mold set, such as would be required to vary the proportions of sizes and styles and in order to make economical use of the machine's full capacity.

One of the greatest of the problems involved, were this to be attempted, would be the preparation, storage, sorting, and effective utilization of the many different patterns of pallet board. Each machine of the type mentioned molds one or several blocks in a mold box closed at the bottom by a pallet board, after which the freshly molded block, still resting on the pallet board, is removed from the mold box and set aside to cure. Pallets for molding cup-and-button blocks must have depressions into which flow the material for forming the buttons, or must have upstanding buttons for forming the cups. The preparation of such pallets in requisite numbers, in each of the many possible patterns to prepare different styles or shapes of blocks in different proportions, would in itself be a task and expensive, for enough of each such pattern (several thousand) would be required to satisfy the machine's capacity for at least forty-eight hours—the minimum curing time—and the sorting, storage, and subsequent selection thereof for reuse would make such a system well-nigh impossible, economically as well as physically.

I have discovered how, by using a single style of pallet, having button-forming depressions or holes arranged in a uniform pattern, and by arranging a relatively small number of styles of mold box and cooperating pressure head in cooperation with the pallet's fixed and standard depression pattern, this one style of pallet will serve all styles, sizes and shapes, and all combinations of such styles, sizes, and shapes of blocks, and their mold boxes and pressure heads, to the end that all excess investment or cost of operation is eliminated, the possibility of confusion or mistake is likewise eliminated, and the flexibility of the mold boxes, pressure heads and pallets in the manufacture of different blocks, or of different ratios of one style of blocks to other styles, and economy of operation in so doing, is to the highest degree facilitated.

More specifically, with especial reference to flexibility, by the present invention the proportion of blocks of one style to blocks of a different style produced upon the same pallet with a single full charge may be readily varied, or a single mold box may be altered readily to produce at different times different styles of blocks, thereby eliminating the necessity, in appropriate circumstances, of substituting a different mold box and cooperating pressure head when changing from one style of block to another, or in changing the ratio of one block to another, and reducing the number of and investment in mold boxes and pressure heads.

The present invention does not concern the block molding machine or its operating mechanism and cycle, as such, but concerns rather the provision of one or several styles of mold boxes and cooperating pressure heads for each box, and a single pattern of pallet and cooperating platform for use with all styles of mold box, each individual mold box, matching pressure head, and a standard pallet constituting a mold set, all coordinated with a standard or known block-molding machine, and cooperating with the parts thereof at least semi-automatically to produce the particular cup-and-button blocks in the proportionate numbers required at any given time, but in different proportions at a different time, when requirements have changed, and without substantial if any alteration of the block molding machine itself, or appreciable change in its operating cycle.

The present invention resides in the block-making machine as modified by or coordinated with the special mold boxes and corresponding pressure heads and with the single style of pallet, and resides especially in the relationship of the standardized pallet and the variously-patterned mold boxes and pressure heads as a mold set for use in and with a standard block-molding machine, in accordance with substantially standard procedures, for the production economically of such proportionate numbers of the several required styles, sizes, and shapes of cup-and-button block as experience, modified by current practice or transient conditions, may show to be necessary. The invention concerns also the standard pallet plate for use with any given mold box and matching pressure head.

The drawings illustrate a standard block-making machine in diagrammatic manner, and show the coordination therewith, at various stages in its cycle, of the standardized pallet and cooperating mold box and pressure head; the drawings also show typical variations in the style of mold box (for each of which there would be a cooperating style of pressure head) and a substantially complete range of styles, sizes, and shapes of cup-and-button block which are required to be produced, in reasonably determinable proportions, which may vary somewhat, nevertheless, from time to time or under varying circumstances.

The blocks shown in Figures 1 to 4, and certain others which include slight modifications not shown therein, represent in general all the various types of blocks necessary to the construction of a building by the cup-and-button style of blocks according to the principles of a certain allied invention of mine which forms the subject matter of two companion applications, Serial Nos. 283,701 and 283,699 the latter of which is now abandoned, both filed April 22, 1952.

In order to understand the problems solved in this invention, a brief explanation of the nature and manner of use of the blocks made according to this invention is required.

Figures 1, 2, 3, 4:
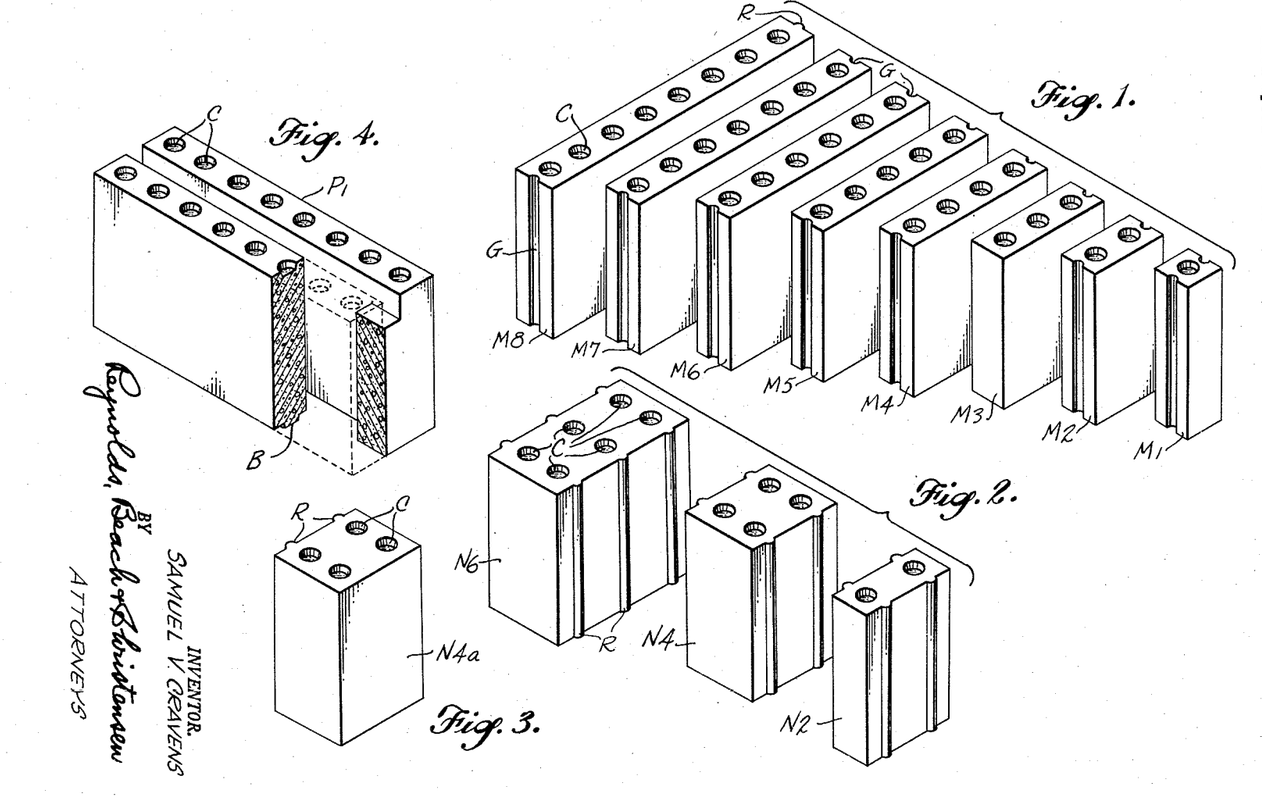
Figure 1 is an isometric view of a group of stretcher type blocks in graduated lengths such as are employed in wall structures of the varying types commonly built with such blocks.
Figure 2 is a view similar to Figure 1, but illustrating the three common types of bond blocks used in such wall structures.
Figure 3 is a similar view of a modified form of bond block employed in such wall structures at special locations, more particularly at a corner.
Figure 4 is an isometric view, with parts broken away, illustrating a special type of double stretcher block usually employed in interior partition walls.

By the use of no more than the several styles, shapes and sizes of blocks shown in Figures 1 to 4, with, in a few instances, slight modifications of one or more thereof, it is possible to erect a great variety of wall structures according to principles which are explained in detail in the companion applications for patent, referred to above. The blocks illustrated in Figure 1 are stretchers, that is to say, they are intended to lie in a given tier and to extend in general lengthwise of a given course, and are intended for use primarily in exterior walls, whether in the exterior, interior or some intermediate tier or curtain, and are to interfit with each other and with crossbond blocks of the type shown in Figure 2, and to a degree that in Figure 3. They can also interfit and cooperate with the blocks P1 of Figure 4, which latter are usually employed in building interior partition walls. The several blocks, in order to distinguish them, are designated, for the stretchers M1 to 8, and for the bond blocks N2, N4 and N6, or for the bond block of the type shown in Figure 3, N4a. The common characteristic of all these blocks, of whatever type, is the provision at one edge or horizontal surface (usually the upper edge) of cups C, and at the opposite edge or horizontal surface of buttons B (see Figure 4) which will fit snugly within the cups of other blocks. These cups and the corresponding buttons are located, relative to one another and to each end surface of the block, at a given modular or multiple modular distance. If the modular distance be taken as one inch—the distance, less clearance, from the centers of the terminal cups and buttons in a row to the end of the block—then the spacing between centers of adjacent cups and buttons in a given block is two inches; the spacing between centers of two adjacent terminal cups or buttons in a course (across the joint) is likewise two inches, a multiple modular distance.

Where there is more than one row of cups and buttons, as in the bond blocks N2, N4, N4a or N6, or in the partition blocks P1, then the spacing in a row is still the same distance as the spacing on the stretcher blocks, but the rows are preferably spaced by a different multiple modular distance (for example, three inches). Of course if the modular distance be taken as the distance between centers of adjacent cups and buttons (two inches) the distance from the center of the terminal cup or button to the end wall is a half-modular distance, and the three-inch spacing between rows would be once and a half times the modular distance. It is only necessary to the understanding of this invention to remember that there is a definite space relationship between the cups and buttons, based on a definite modular distance, and that the spacing between rows is likewise preferably based on the same modular distance. The thickness of the blocks is also related to the selected modular distance.

With the cups and buttons so located, it is possible to rest any one block upon any other block or any combination of blocks by a shift equal to the distance between cups and buttons, whereupon all the buttons of the one block above will rest within the corresponding cups of the block or blocks below, and this will be true whether the blocks be in the same tier or in different tiers, or in a transverse bulkhead or pillar, and will be true of the blocks in one course as related to those of the course above and the course below. When the blocks are thus located and interlocked by interengagement of their cups and buttons, each block is accurately located so that its vertical edge precisely abuts, with but very slight clearance, the adjoining vertical edge of the adjoining block or blocks, and where one block spans the joint between any two blocks below it or above it, that block acts to intertie the two such blocks, and as a bond to make the wall an integral whole, whether in any one given curtain or tier, or as between two or more curtains or tiers. Similarly as to the interior partition blocks of the type P1 shown in Figure 4, or a modification thereof which is not shown, but which also is disclosed in a companion application, the cups and buttons assist in the correct and accurate location of the blocks with relation one to another and of all within the entire wall, so that by these provisions in all the various types of walls, it is unnecessary, in fact, impossible, to utilize mortar to bond together the several blocks—their spacing at a joint is too slight to admit mortar, nor is mortar needed for bonding.

In addition to the cups and buttons the blocks (or certain of them) may have at their vertical end edges grooves G or ribs R, either or both, or alternately at the two ends a rib and a groove, for the purpose of assisting in maintaining the blocks in coplanar relationship, especially when a block spans a gap and does not rest throughout its length upon a lower block, and to block the possibility of drafts through the small interstices between adjoining blocks. These, too, are located at modular or multiple modular intervals, but may be omitted in some instances (for example, where a ribbed or grooved block exposed at a corner would be unsightly), and this constitutes the only difference between the blocks N4 and the blocks N4a, and is one of the distinctive features of the block M3. In some walls many of the unribbed blocks N4a would be required, and relatively few of the style N4, whereas in other walls the proportionate amounts would be reversed, or different. This illustrates the desirability of being able to vary readily the proportionate numbers produced of different styles of block.

The present invention is concerned with the mechanism for manufacturing such blocks in the various styles, shapes and sizes necessary and in the correct proportionate numbers of the different styles of blocks. It will be evident that a large number of stretcher blocks of the style M8 would ordinarily be needed, and also of a somewhat smaller size, such as M4, and that only a few of the style of the blocks M1 would be required, and a very small number of the style M3. Likewise, the proportionate number of blocks N2, N4 and N6 will depend upon the style of wall structure which is to be erected. In one style of wall structure no blocks N6 would be required, and in another style of wall structure few, if any, of the style N2 would be required. The possible variation in the ratio of style N4 to style N4a has already been mentioned. The problem with which the present invention is concerned, then, is how to manufacture these several styles, sizes and shapes of block in the proportionate numbers required at any given time, to the end that there shall be no great excess of one style not required at the time, over other styles, and no shortage of a required style the manufacture whereof would produce an artificial excess of an unwanted style, and yet to accomplish this end without increasing inordinately, to or beyond the point of economic impracticability, the number of styles of pallet used in doing so.

Concrete blocks are customarily molded by a machine of a type which will now be described, but only in sufficient detail to make clear the coordination of its parts with the special parts that concern the present invention. A mold box 1, open at top and at bottom, interiorly partitioned at 11 to define a number of compartments designed to produce blocks of the style or styles desired, is fixedly although removably supported, as on a frame element 10 of the machine. Being removably supported, a differently partitioned mold box may be substituted for any given style of mold box. A pallet beam 2 is movable vertically beneath the mold box 1 and carries a platform 21, or similar support, for a loose pallet 9. The vertical movement of the pallet beam 2 ranges from a lowermost position shown in Figure 7, to its uppermost position shown in Figures 5 and 6. Its movement, under automatic control, is suitably effected between these positions, as for example by an hydraulic cylinder 20 with its plunger 22. A pressure beam 3 is located immediately above the mold box 1, and to it is removably secured a pressure head 30, which is constituted principally by depending plungers 31, each of a shape and accurately located to fit closely within the individual mold compartments defined by the partitions 11. The pressure beam 3, with its pressure head, is movable vertically from an uppermost position shown in Figure 5, through an intermediate position shown in Figure 6, to a lowermost position shown in Figure 7. It is provided with pendent contact elements 32 which serve to prevent squeezing and deformation of compressed blocks when the pressure beam and pallet beam move downwardly simultaneously to eject the formed blocks from the mold box. These elements 32 also assist in controlling the movement and position of the several parts, and in effecting certain intermediate operations, as, for example, in effecting the beginning and ending of the vibrational compression of the concrete charge within the mold box when parts are in the position shown in Figure 6. However, the cooperating controlling and vibrating mechanism is not shown, as it is a part of a known concrete block molding machine. Neither is the mechanism for effecting the vertical movement, or controlling its extent shown, as that, too, is a part of the same known concrete block molding machine.

Figure 5:
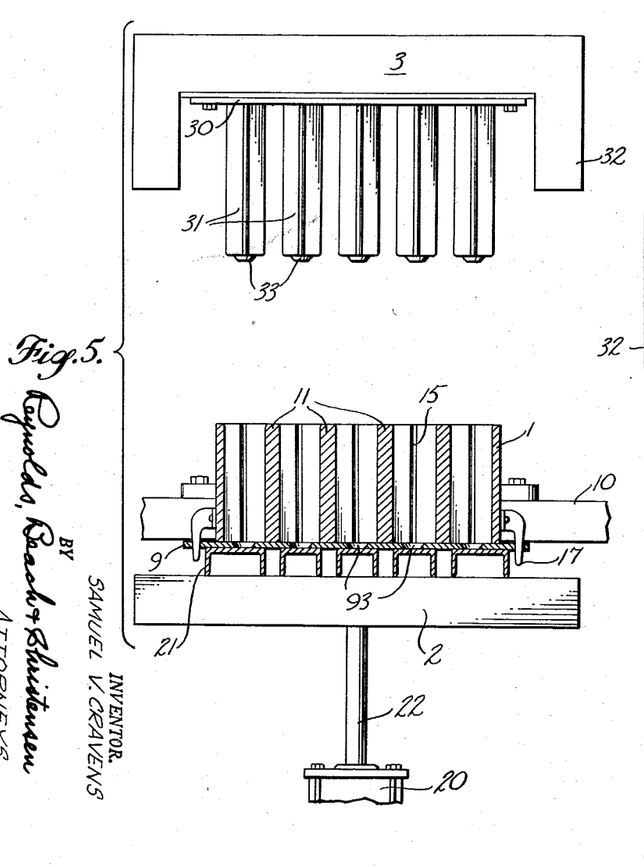
Figure 5 is a front elevational view, with a mold box and pallet structure and support in section, illustrating a typical arrangement of the mold box, pressure head, and pallet in conjunction with elements of a standard block molding machine, with parts in the position they would occupy relatively at the commencement of a cycle, during the charging stage.
Figures 7, 8:
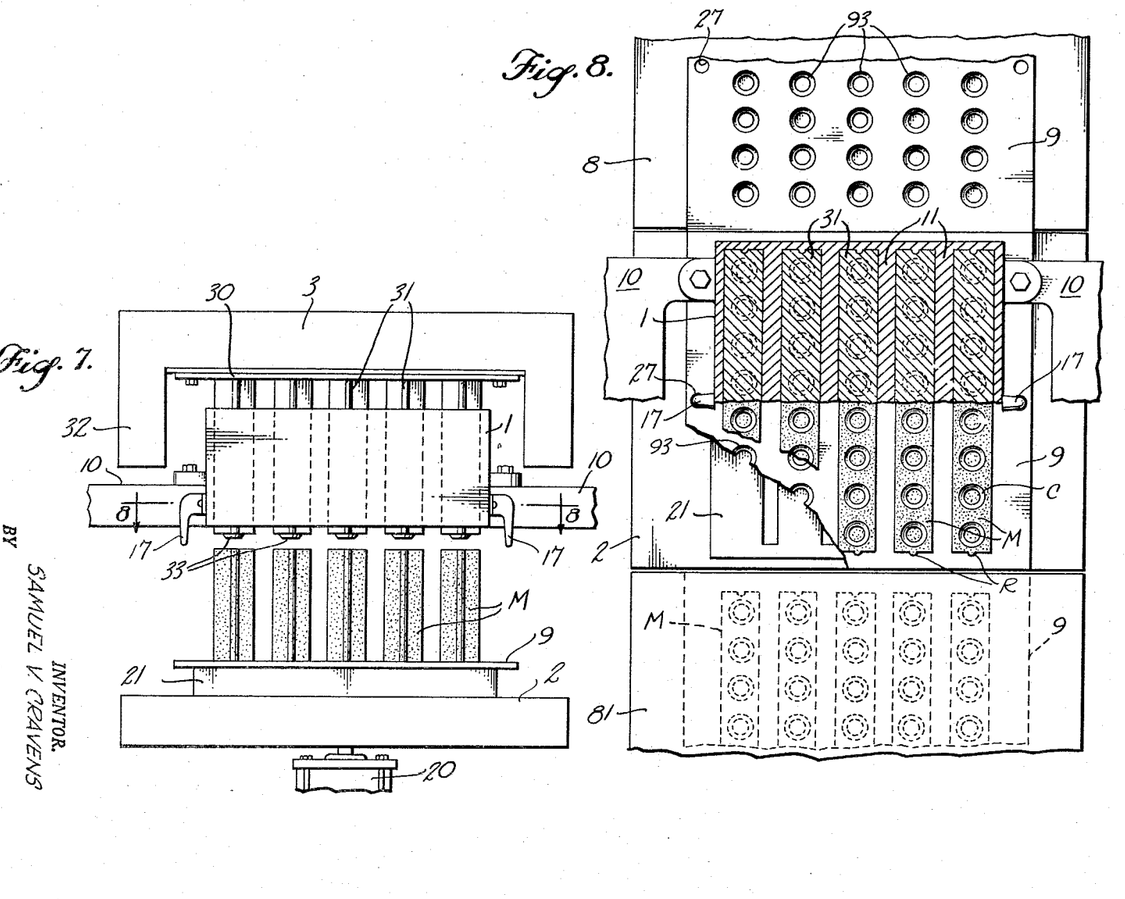
Figure 7 is a view similar to Figure 6, illustrating the parts in the relative positions they would occupy at a subsequent stage in the cycle, following ejection of the compressed blocks from the mold box but preceding the advance of the freshly molded blocks from registry with the mold box.
Figure 8 is in part a broken-away plan view and in part a horizontal sectional view, illustrating parts in the position corresponding to Figure 7, the line of section being indicated at 8—8 of Figure 7.

The cups in the upper edge of each block are formed by correctly shaped projections 33 upon the lower ends of the pressure head plungers 31. These, of course, must be spaced by the correct modular or multiple-modular distance in the rows, and must be spaced correctly transversely of the rows. The corresponding buttons on the bottom surface of each block are formed by correctly shaped depressions 93 in the pallet 9. It is preferred that each pallet be formed of a metal plate, and these depressions 93 are formed as countersunk apertures through the plate. In order that the charge of concrete or "mud" shall not spill out in part through these apertures and so create a void or defect in the block, each such aperture 93 is closed by reason of the fact that it rests flat upon the platform 21. However, in order to insure ready escape of any concrete that may drop through the apertures, the platform 21 is made somewhat gridlike, as is best seen in Figures 5 and 8, affording spaces non-coincident with the rows of apertures 93 through which any spilled material may drop and escape.

Figure 9:
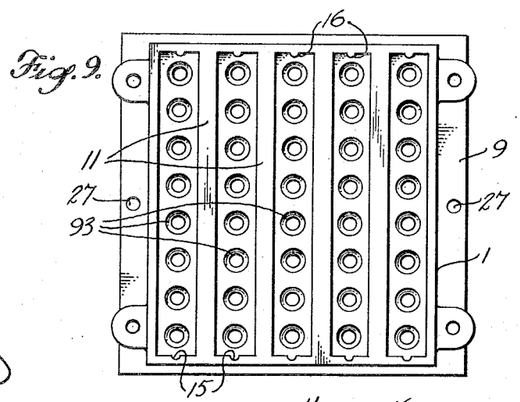
Figures 9, 10, 11 and 12 are plan views of several typical styles of mold box, each in operative position with relation to a standardized pallet and its pattern of button-forming depressions. The mold boxes of Figures 9, 10 and 11 are in themselves unchangeable, whereas the mold box of Figure 12 is provided with removable elements, which permits the style of blocks to be molded to be changed somewhat.
Figure 10:
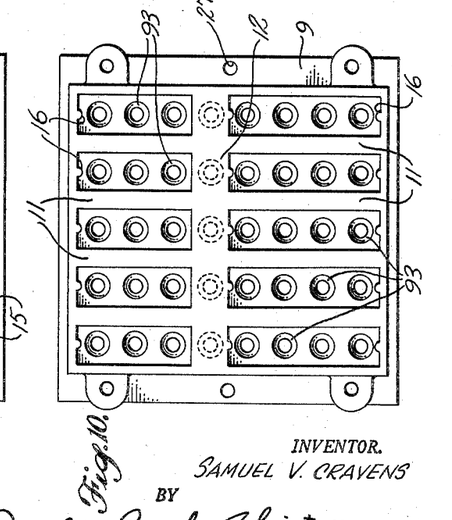
Figure 11:
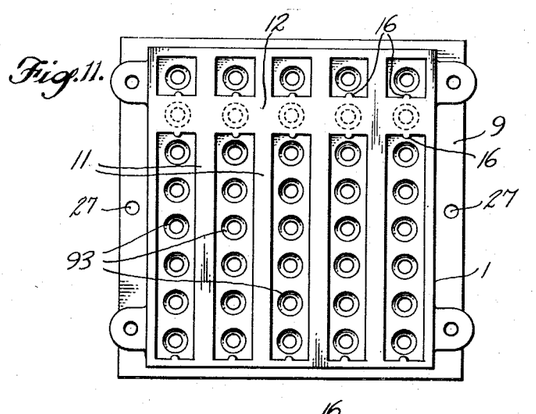

It will be observed (see, for example, Figure 9) that each pallet 9 is provided with five rows of depressions 93, in each of which rows there are eight button-forming depressions. Thus there are forty depressions, located according to a standard and regular pattern, in each pallet; more or fewer might suffice, or the pattern might be different, but it should be uniform throughout all pallets. By suitable arrangement of the partitions 11, the illustrated pallet and mold box combination, with the corresponding pressure head, will produce five blocks of the style M8. By the use of transverse partitions, as indicated in Figures 10 and 11 at 12, the mold box compartments may be subdivided so that in Figure 10 there can be produced five blocks of the type M4 and likewise with the same charge five of the type M3, or in Figure 11, there are produced five of the type M6, and five of a type very closely resembling the type M1, but lacking one of the grooves, and which therefore might be termed type M1a. It would be entirely feasible, of course, to design this particular mold box of Figure 11 to manufacture at least the five blocks M1 in conjunction with the blocks M6. The double stretcher blocks P1 can also be made in the same sort of mold box, with the standard pallet, merely utilizing an extra partition on the pressure head, or applied to and upstanding from the pallets, to define the central aperture A.

Figure 12:
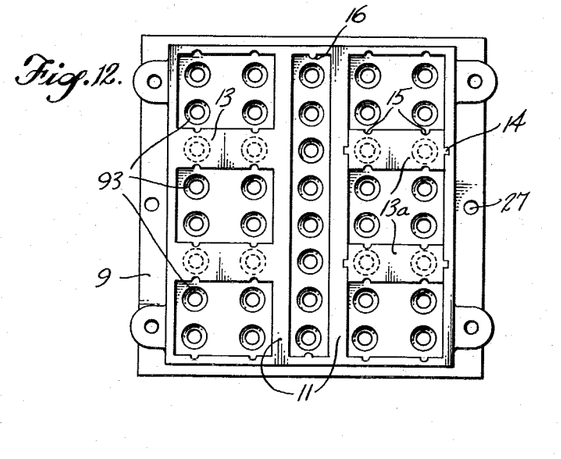

Still further, in Figure 12, partitions 13 are employed, similar to the partitions 12, but here some of the partitions 11 are omitted, and now the arrangement will produce blocks of the type N4. Other transverse partitions 13a are illustrated here, similar to the partitions 13 except that they are removable, being held in place by keys fitting within vertical keyways in the walls and partitions of the mold box, as indicated at 14, whereby slightly different partitions 13a may be substituted for those of the type shown. In the arrangement illustrated in Figure 12, a single charge will produce six blocks N4, plus a block M8 to use up the remainder of a single charge, yet by removing the partitions 13a and substituting partitions which omit the grooves 15, blocks of the type N4a are readily produced. This affords flexibility and eliminates the necessity for a special mold box to make the latter type of block, only a few of which are normally required, and the number of which, in proportion to other types of block, is likely to vary widely from time to time.

Instead of the grooves 15 to produce ribs R there may be in some of the mold box compartments vertical ribs 16 which will produce the grooves G in the molded blocks.

It will be noted that wherever cross partions are employed, such as those at 12 or 13, or at 13a, each such partition is of a thickness to blank out one or one set of the depressions 93, but no more than the one, and to bring the wall of the partition to within the correct distance from the next set of depressions, so that the block, when molded, will have its vertical surfaces spaced exactly correctly from the center of the buttons formed by the depressions 93. By such expedients the charge employed is but little, if any, changed as between different styles of mold box, and in particular is not greatly reduced at any time nor by any style of mold box, and thus the output of the machine volumetrically is practically constant. By suitably combining compartments shaped to provide the several styles of block from a single charge, and upon a single standard pallet, the proportionate number of blocks of the different styles is kept within the bounds determined by experience to be necessary, yet the capacity of the machine is not greatly reduced, nor is there any necessity for a large number of different mold boxes and corresponding pressure heads. This is furthered, also, by the occasional use of removable partitions such as those at 13a in Figure 12.

It will be evident by now that such block molding operations can only be performed if precise accuracy obtains throughout the molding and compressing stages of the operation, between the removable standardized pallets 9 with their forty depressions 93 and each mold box with which each such pallet cooperates. Inasmuch as these pallets are fed along a feed table 8, laterally and singly into position beneath the mold box 1, and then are raised into position to close the bottom of the mold box, such accuracy may be attained by providing complemental registering means, such as pins 17 secured to and depending downwardly from opposite sides of the mold box 1, in position to enter and center themselves within apertures 27 in each pallet, in the manner shown, for example, in Figures 5 and 6. Two or more such cooperating pins and apertures will locate each pallet and its pattern of depressions 93 very accurately with relation to the mold box 1 and its partitions, yet the two may readily be separated after compression and forming of the blocks and lowering of the pallet.

Figure 6:
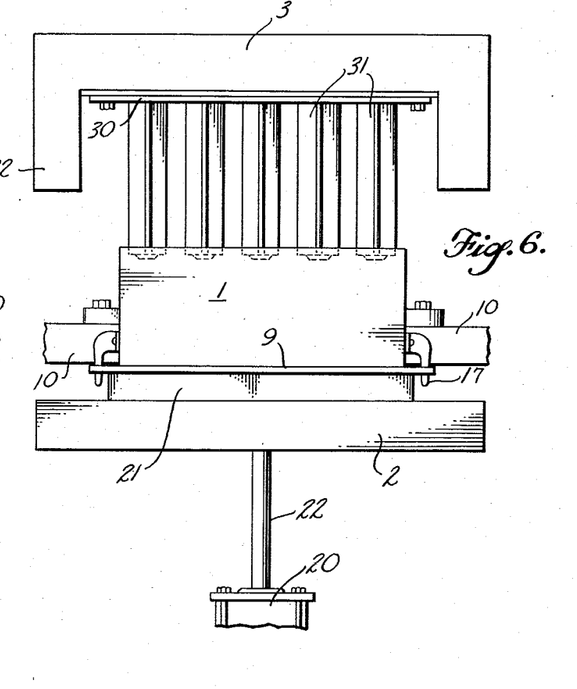
Figure 6 is a view similar to Figure 5, but with the parts in front elevation only, and illustrated in the relative positions they would occupy during a subsequent compressional stage of the cycle.

The cycle of operations is as follows. Assume a pallet 9 to be located in position to close the bottom of a mold box 1, the pallet being upraised while resting in accurate relative position upon its platform 21 and pallet beam 2, and assume the pressure beam 3 and pressure head 30 are upraised to their uppermost position; parts are in the position shown in Figure 5, ready for receiving a charge. A charge of "mud" is delivered in a known manner into the mold box 1, being accurately measured. Leaving the pallet beam 2 and its pallet 9 still upraised, the pressure beam 3 now lowers to an intermediate position wherein the lower ends of its plungers 31 enter into and close the tops of the respective compartments of the mold box and are a predetermined distance above the pallet 9. This position is shown in Figure 6. Alone or in conjunction with vibration, this effects compression of the subdivided charge in the several compartments. The projections 33 at this stage define the cups in the upper surface of the blocks, while at the same time the buttons are being formed on the blocks by the depressions 93 into which the "mud" is forced.

Upon completion of this compression stage, and usually under automatic control, the pallet beam 2 and its pallet 9 move downwardly, and the pressure beam 3 and its pressure head 30 likewise move downwardly, at the identical time and rate, to eject but not to disturb the formed blocks, designated generally in Figure 7 by the letter M, from the mold box compartments, but leaving them resting in unaltered relationship upon the pallet 9. This simultaneous downward movement continues until the blocks M are clear of the mold box 1, whereupon downward movement of the pressure beam 3 ceases but the pallet beam 2 moves slightly farther downwardly, so that the blocks move downwardly clear of the projections 33. This lowermost position of the parts is shown in Figure 7.

In this position the pallet beam 2 is at its lowermost level, and by proper design of the machine, a fresh pallet 9 now rests upon the table 8 coplanar with the pallet 9 which bears the blocks M. The fresh pallet 9 is now fed edgewise, manually or automatically, and pushes ahead of it the loaded pallet, pushing the latter onto an off-bearing table 81, whence the loaded pallet is carried away and set aside until the concrete in the blocks has set. The fresh pallet, however, moves laterally or edgewise until it is in position beneath the mold box 1, whereupon, normally by automatic control, the pallet beam 2 moves upwardly again, as does the pressure beam 3, until parts resume the position shown in Figure 5. During the final portion of the upward movement of the pallet beam 2, the apertures 27 in the newly positioned pallet are entered by the register pins 17, and the fresh pallet is automatically accurately located with relation to the mold box. This completes the cycle and the mold box is ready for a second charge.

The edgewise movement of each pallet with its load of freshly molded blocks over the platform 21 wipes the lower exposed ends of the buttons B, and this wiping action insures sharp definition of the edges of the button, yet the concrete is already compacted, and is not so disturbed that it will drop through the apertures, nor spill out. Any few grains that may crumble off are swept ahead of the oncoming fresh pallet, and may spill through the slots in the platform 21.

The pallets 9, being preferably of steel plate, may be rugged and strong while yet reasonably thin and light. Each with its load of fresh blocks may be handled with a fair degree of ease, and can be racked up to dry. The dry blocks can be removed from a pallet with minimum likelihood of injury to the blocks and to the pallet, and the pallet is easily cleaned. Many such pallets may be stacked in a small space. Each being identical with all others, they can be made by quantity-production methods, and can be handled by automatic machinery. It is nearly impossible to present a pallet incorrectly within the block molding machine. The one style of pallet will serve for the production of every necessary style, size, or shape of block, with the assurance that the block's buttons will be located accurately and correctly, automatically. The number of different mold boxes and pressure heads to correspond is appreciably less than the total number of different styles of block. A minimum of investment and a maximum of output are assured by this invention.

I claim as my invention:

1. In a machine for molding multiple concrete blocks each with cups and buttons at regular modular spacings, in combination, a fixedly located mold box open at top and at bottom and interiorly vertically partitioned in a pattern to define a plurality of compartments, also open at top and bottom, which correspond to standard sizes, shapes, and styles of blocks, an overhead pressure beam movable downwardly and upwardly relative to said mold box, a pallet beam beneath and movable upwardly and downwardly relative to the mold box, a plurality of pallets, each formed with button-forming depressions spaced by modular spacings in a uniform patern, and each pallet of a size and shape to close the bottom of the entire mold box, movable singly into mold-box-closing position onto the lowered pallet beam, cooperating register means carried by the mold box and by each such pallet, respectively, for interengagement to position the pallet with its depressions all accurately and modularly located relative to its walls and partitions when the pallet beam on rising lifts the pallet into contact with the bottom of the mold box, and disengageable when the pallet beam is lowered, and a pressure head comprising a plurality of plungers each formed with modularly spaced and located cup-forming projections, and each of size and shape, and fixedly located on and depending beneath the pressure beam in position to close the top of each mold box compartment when the pressure beam is lowered from its uppermost to an intermediate position, and to eject formed blocks from all the compartments simultaneously as the pressure beam and the pallet beam move downwardly simultaneously until the formed blocks clear the mold box and the pallet beam approaches its lowermost position.

2. A multiple concrete block molding machine as in claim 1, characterized in that the pallet beam in its lowermost position has lowered the pallet and the formed and ejected blocks supported thereon from contact with the pressure head's plungers, and means guiding a further pallet, on the same level as the block-supporting pallet, for edgewise movement into vertical registry beneath its eventual mold-box-closing position and for simultaneous pushing of the block-supporting pallet from its lowermost position.

3. In a machine for molding multiple concrete blocks each with cups and buttons at regular modulator spacings from one another and from the blocks's side walls, in combination, a fixedly located mold box open at the top and at bottom and interiorly vertically partitioned in a pattern to define a plurality of compartments, also open at top and bottom, which correspond to standard sizes, shapes, and styles of blocks, means to support said mold box removably in such fixed location, whereby an alternative mold box, differently partitioned and patterned, may be substituted for the first, an overhead pressure beam movable downwardly and upwardly relative to the fixedly located mold box, a pallet beam beneath and movable upwardly and downwardly relative to the mold box, a plurality of pallets, each formed with button-forming depressions spaced by modular spacings in a uniform pattern and each pallet of a size and shape to close the bottom of the entire mold box, movable singly into mold-box-closing position onto the lowered pallet beam, with its depressions accurately and modularly spaced relative to the mold box's partitions and walls, a pressure head comprising a plurality of plungers each formed with modularly spaced and located cup-forming projections, and each of size and shape, and fixedly located on and depending beneath the pressure beam in position to close the top of each individual mold box compartment when the pressure beam is lowered from its uppermost to an intermediate position, and to eject formed blocks from all the compartments simultaneously until the formed blocks clear the mold box and the pallet beam approaches its lowermost position, and means to support said pressure head removably in its fixed position on the pressure beam, whereby an alternative pressure head, corresponding to an alternative mold box, may be substituted for the first when such an alternative mold box is employed.

4. A multiple concrete block molding machine as in claim 3, including means engageable with each pallet, while it is in mold-box-closing position, to locate it and its depressions exactly relative to the mold box.

5. A multiple concrete block molding machine as in claim 3, including pins projecting downwardly from each mold box, and each pallet having holes positioned to receive said pins as the pallet beam moves upwardly into mold-box-closing position, whereby to locate the pallet and its depressions accurately relative to the mold box.

6. A mold set for the molding of blocks of concrete or the like with precisely located cups in one horizontal surface and like buttons projecting from the opposite horizontal surface, consisting of a mold box, pressure head, and pallet plate, for use with a known concrete block molding machine such as includes a stationary frame member for the support of said mold box, an overhead pressure beam for the support of said pressure head, and a pallet beam beneath the stationary frame member and the pressure beam, whereon said pallet plate may rest, and in which molding machine the pallet beam and its pallet are movable upwardly to close the mold box and then the pressure beam and its pressure head are movable downwardly with respect to the stationary frame member to enter the top of the mold box, and thereafter the pressure beam and pressure head and the pallet beam and pallet plate are movable conjointly downwardly to eject molded blocks from the mold box, and the pallet beam and pallet plate are further movable downwardly with respect to the pressure beam to disengage the pallet-supported blocks from the pressure head; said mold box, pressure head, and pallet plate mold set comprising a plurality of identical pallet plates for successive individual cooperation with each single mold box and matched pressure head, and each formed with button-forming depressions spaced by modular spacings in a standard pattern, and each of an over-all size and shape to close the bottom of the entire mold box, said mold box being formed in various styles, any given style having vertically disposed, fixedly mounted partitions intermediate its walls to define a plurality of compartments, each open at top and bottom, and arranged to define a set of blocks of standard sizes, shapes, and styles, complemental means engageable between each of said pallet plates and said mold box to effect registry of the successive pallet plates' depressions at modular distances inwardly from the mold box's walls and partitions, for blocks of the selected set, and said pressure head including a plurality of pendant block-ejecting plungers each of a size and shape to correspond with and to fit closely within its individual one of the matched mold box compartments, each plunger having buttons formed on its lower end, of a shape complemental to each pallet plate's depressions, and located at modular distances inwardly from the mold box's walls and partitions, when so fitted within such compartments, each in correct vertical registry with a given pallet plate's depressions, but spaced therefrom, at closest approach, by the height of the block to be molded.

7. A mold set as in claim 6, wherein the depressions of each pallet plate are arranged in a plurality of rows, at multiple-modular spacings in each row, but with the rows at greater spacings, the partitions of the mold box being located, by the registry means, intermediate the several rows, and the partitions being of such thickness that when so located they are spaced by the modular distance at the opposite sides of each row of depressions.

8. A mold set as in claim 6, including additional and secondary partitions in selected mold boxes, lying in planes directed transversely to the row-defining primary partitions, and subdividing selected compartments into subcompartments, each secondary partition being of a thickness, and located, to blank out a depression in the subdivided compartment, and to remain spaced from each adjacent depression by the modular distance.

9. A mold box and cooperating pallets as and for the purpose set forth in claim 8, characterized in that certain of said secondary partitions are removable, for substitution of alternative partitions, and means interengageable between said removable partitions and their cooperating primary partitions to locate the removable partitions, or substitute partitions, accurately at the specified modular distance.

10. For use with cooperating mold boxes of standard peripheral size and shape, but variously partitioned, in the multiple-molding of cup-and-button concrete blocks in sizes, styles, and shapes to correspond to the various partition arrangements, a pallet comprising a substantially flat plate of a size to include the periphery of each cooperating mold box, locating means on the pallet for engagement by complemental means on the mold box, to locate the pallet exactly relative to any such mold box, each pallet plate being formed with parallel rows of depressions in its upper face, regularly spaced apart by a twice-modular distance, with the two terminal depressions in each row spaced from the location of the periphery of the mold box by the modular distance, and with the several rows of depressions spaced from the locations of the peripheral walls and of the partitions by the modular distance.

11. A pallet as and for use in the manner set forth in claim 10, wherein the rows of depressions are spaced from one another by a fixed distance which is in excess of twice the modular distance.

References Cited in the file of this patent

UNITED STATES PATENTS

| Number | Name | Date |
| --- | --- | --- |
| 709,495 | Levi | Sept. 23, 1902 |
| 819,746 | Forbes | May 8, 1906 |
| 835,405 | Dahn et al. | Nov. 6, 1906 |
| 1,507,515 | Potter | Sept. 2, 1924 |
| 1,641,922 | Davis | Sept. 6, 1927 |
| 1,699,017 | Poore | Jan. 15, 1929 |
| 1,905,975 | Thomas | Apr. 24, 1933 |
| 1,976,627 | O'Rourke | Oct. 9, 1934 |
| 1,984,363 | Dietrichs | Dec. 18, 1934 |
| 2,152,569 | Root et al. | Mar. 28, 1939 |
| 2,382,458 | Williams et al. | Aug. 14, 1945 |
| 2,455,553 | Briscoe | Dec. 7, 1948 |
| 2,529,066 | Annas | Nov. 7, 1950 |
| 2,532,049 | Wittke | Nov. 28, 1950 |
| 2,542,584 | Sherman et al. | Feb. 20, 1951 |
| 2,583,818 | Cihlar | Jan. 29, 1952 |
| 2,594,760 | Flam | Apr. 29, 1952 |

UNITED STATES PATENT OFFICE
CERTIFICATE OF CORRECTION

Patent No. 2,856,668                              October 21, 1958

Samuel V. Cravens

It is hereby certified that error appears in the printed specification of the above numbered patent requiring correction and that the said Letters Patent should read as corrected below.

Column 10, line 5, for "modulator" read -- modular --; line 7, for "at the top" read -- at top --; column 11, line 13, after "for" insert -- the --; line 33, for the claim reference numeral "6" read -- 7 --.

Signed and sealed this 10th day of February 1959.

(SEAL)
Attest:

CARL H. AXLINE
Attesting Officer

ROBERT C. WATSON
Commissioner of Patents